(12) United States Patent
Baldemair et al.

(10) Patent No.: US 11,075,727 B2
(45) Date of Patent: Jul. 27, 2021

(54) METHODS TO MITIGATE TRANSIENT TIMES

(71) Applicant: Telefonaktiebolaget LM Ericsson (publ), Stockholm (SE)

(72) Inventors: Robert Baldemair, Solna (SE); Jung-Fu Cheng, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 59 days.

(21) Appl. No.: 16/617,034

(22) PCT Filed: Jun. 15, 2018

(86) PCT No.: PCT/EP2018/066018
§ 371 (c)(1),
(2) Date: Nov. 26, 2019

(87) PCT Pub. No.: WO2018/229277
PCT Pub. Date: Dec. 20, 2018

(65) Prior Publication Data
US 2020/0153573 A1 May 14, 2020

Related U.S. Application Data

(60) Provisional application No. 62/528,713, filed on Jul. 5, 2017, provisional application No. 62/520,536, filed on Jun. 15, 2017.

(51) Int. Cl.
*H04L 5/00* (2006.01)
*H04L 27/26* (2006.01)

(52) U.S. Cl.
CPC .......... *H04L 5/0044* (2013.01); *H04L 5/0042* (2013.01); *H04L 27/2602* (2013.01)

(58) Field of Classification Search
CPC .. H04L 5/0044; H04L 5/0042; H04L 27/2602
See application file for complete search history.

(56) References Cited

U.S. PATENT DOCUMENTS

| | | | |
|---|---|---|---|
| 2014/0241294 A1 | 8/2014 | Gaal et al. | |
| 2016/0080187 A1* | 3/2016 | Yun | H04L 27/38 375/261 |
| 2016/0234706 A1 | 8/2016 | Liu et al. | |
| 2019/0222254 A1* | 7/2019 | Kim | H04L 5/0094 |

* cited by examiner

*Primary Examiner* — Duc C Ho
(74) *Attorney, Agent, or Firm* — Coats & Bennett, PLLC

(57) ABSTRACT

Techniques for mitigating transient overlap times between wireless signals are presented. For instance, an example method performed by a transmitting device is presented that includes generating a signal comprising data to be transmitted to a receiving device during a symbol by modulating the data on L-K L-combs. In an aspect, each L-comb has an associated group of subcarriers that are separated from one another by L-1 subcarriers. In addition, in some instances, the method can include the transmitting device transmitting the generated signal to the receiving device (106) during at least a portion of the symbol. Corresponding devices and computer/processor-executable instructions are also described.

20 Claims, 17 Drawing Sheets

```
          ┌─────────────────────────────────────────┐
          │  GENERATE A SIGNAL COMPRISING DATA TO BE │   1300
          │  TRANSMITTED TO A RECEIVING DEVICE       │
          │  DURING A SYMBOL BY MODULATING THE DATA  │
          │  ON L-K L- COMBS, WHEREIN EACH L-COMB    │
          │  HAS AN ASSOCIATED GROUP OF SUBCARRIERS  │
          │  THAT ARE SEPARATED FROM ONE ANOTHER     │
          │  BY L-1 SUBCARRIERS                      │
          │                 1302                     │
          └─────────────────────────────────────────┘
                             │
                             ▼
          ┌─────────────────────────────────────────┐
          │  TRANSMIT THE GENERATED SIGNAL TO THE    │
          │  RECEIVING DEVICE DURING AT LEAST A      │
          │  PORTION OF THE SYMBOL                   │
          │                 1304                     │
          └─────────────────────────────────────────┘
```

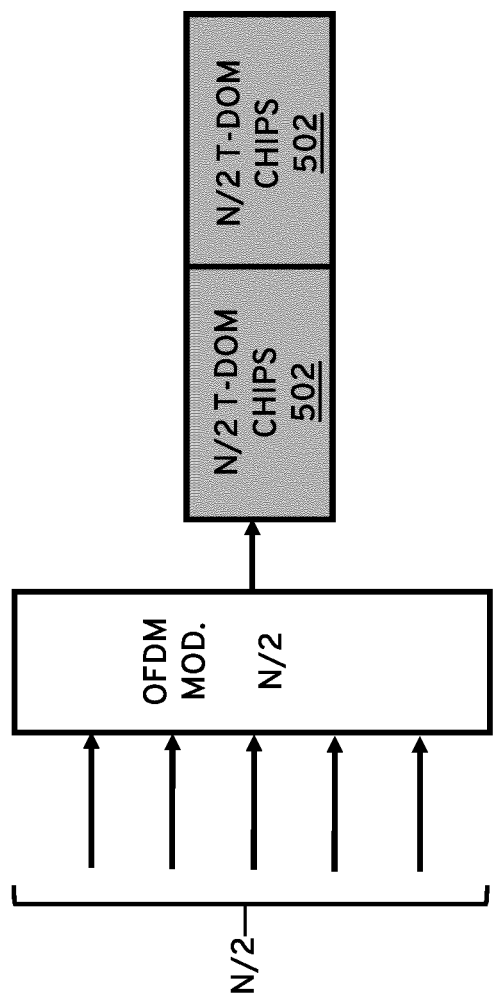

METHODS TO MITIGATE TRANSIENT TIMES

CROSS-REFERENCE TO PRIORITY APPLICATIONS

The present application claims the benefit of U.S. Provisional Application No. 62/520,536, filed Jun. 15, 2017 and U.S. Provisional Application No. 62/528,713, filed Jul. 16, 2017, both entitled "Methods to Mitigate Transient Times" and both being incorporated herein by reference.

TECHNICAL FIELD

The application relates to methods and apparatus for mitigating present issues with times of transient power, phase and/or frequency in wireless signal communication.

BACKGROUND

Presently, in Long Term Evolution (LTE) and New Radio (NR) a transport block is segmented into multiple code bocks if the transport block size exceeds the maximum code block size. In LTE, uplink code blocks are mapped time-first, i.e. a code block is distributed across multiple Orthogonal Frequency Division Multiplex (OFDM) symbols (in fact, for reasonable code block sizes, a code block is distributed to all OFDM symbols). The advantage of time-first mapping is robustness to time-localized impairments; if e.g. one OFDM symbol is impaired all code blocks are impacted a bit. Since error correction is done per code block it is better to impair each code block a bit than one code block much since failure in a single code block results in lost transport block reception. Drawback of time-first mapping is latency: On the transmitter side (almost) all code blocks need to be encoded to construct the first OFDM symbol increasing the time delay between UL grant reception and UL data transmission. On the receiver side, decoding can only start after the last OFDM symbol has been received since (almost) all code blocks are mapped to all OFDM symbols.

In frequency-first mapping, a code block is first mapped to the available resource elements within an OFDM symbol and only if the code block does not fit into an OFDM symbol it is mapped to multiple OFDM symbols. For high data rates a code block is typically confined to a single OFDM symbol (even multiple code blocks can fit into a wide bandwidth) and only at bandwidth edges a code block stretches across two OFDM symbols. At the transmitter only one or few code blocks need to be encoded prior transmitting the first OFDM symbol. At the receiver side decoding can start after the OFDM symbol(s) containing the first code block has been received. A time-localized impairment can heavily impair a single code block which makes it impossible to successfully decode the code block resulting in a lost transport block.

Power amplifiers (PAs) cannot infinitely fast change their power levels, e.g. change from one power level to another or switch on off. Instead of an intermediate power level switch the PA output power gradually approaches the target power level; the majority of this power changes happens within a so called transient time. The gradient of power changes is typically not specified and can neither easily be determined by the receiver. Furthermore, the phase of the output signal may change during the transient time.

A similar problem can occur if the frequency allocation changes, either the total allocated bandwidth or the location of the allocated bandwidth. One example is for example frequency-hopping. If the hopping happens within the configured user equipment (UE) bandwidth the transient time is probably short but can still be larger than zero if e.g. the UE needs to switch filter and/or needs to reduce power to fulfill out-of-band-emission after the frequency-hop. If the frequency-hopping is done outside the UE configured bandwidth the UE needs to retune its local oscillator which also results in a (typically longer) transient time.

If a UE transmits one physical channel/signal and during the transmission duration another physical channel/signals is activated the total output power changes if not the power of the first signal is reduced (which is undesirable). Therefore, also in this case transients can occur. The same applies if a UE transmits multiple physical channels/signals and one or more signals are stopped earlier.

During a transient time, a channel estimate obtained from reference signals is not valid, and therefore receiver cannot fully utilize the estimate. If a code block is transmitted during a transient period, decoding of that code block can fail (particularly if the transient overlaps with the code block more than a threshold amount), and therefore the transport block can fail. This reduces throughput and increases delay in the system.

NR also introduces per-code-block-group (CBG) Hybrid Automatic Repeat Request (HARQ) feedback where decoding success/failure is signaled to the transmitter per group of code blocks. The performance results are often unsatisfactory, however, where default operation of the system requires CBG-based HARQ feedback. Accordingly, alternative solutions are required going forward.

SUMMARY

Techniques for mitigating transient overlap times between wireless signals are presented. For instance, an example method performed by a transmitting device (e.g., a user equipment or network node) is presented that includes generating a signal comprising data to be transmitted to a receiving device (e.g, a user equipment or network node) during a symbol (14) by modulating the data on L–K L-combs. In an aspect, each L-comb has an associated group of subcarriers that are separated from one another by L–1 subcarriers. In addition, in some instances, the method can include the transmitting device (102) transmitting the generated signal to the receiving device (106) during at least a portion of the symbol (14).

In addition, another example method is presented which is performed by a receiving device in a wireless communication system, which include determining that a transient period, during which a transmission gain, phase, and/or frequency is unstable, at least partially overlaps a transmission period of a symbol, during which symbol contents is to be transmitted, the symbol having a symbol duration. In addition, the example method can include receiving one or more copies of the symbol contents based on the determining and processing the one or more copies of the symbol contents.

A further method performed by a transmitting device in a wireless communication system is presented, which includes determining that a transient period, during which a transmission gain, phase, and/or frequency is unstable, at least partially overlaps a transmission period of a symbol, during which symbol contents is to be transmitted, the symbol having a symbol duration. In addition, the example method includes generating one or more copies of the symbol contents based on the determining and transmitting the one or more copies of the symbol to a receiving device during the symbol duration.

Furthermore, an example receiving device (106) is presented, which is configured to receive a signal comprising data transmitted by a transmitting device, the transmitting device modulating the data on L-K L-combs. In an aspect, each L-comb has an associated group of subcarriers that are separated from one another by L-1 subcarriers. In addition, the receiving device is configured to demodulate the data on the L-K L-combs.

Likewise, an example transmitting device is presented that is configured to generate a signal comprising data to be transmitted to a receiving device during a symbol by modulating the data on L-K L-combs. In an aspect, each L-comb has an associated group of subcarriers that are separated from one another by L-1 subcarrier. The transmitting device is configured to also transmit the generated signal to the receiving device during at least a portion of the symbol.

In addition, another example method performed by a receiving device is presented. This example method includes receiving a signal comprising data transmitted by a transmitting device, the transmitting device modulating the data on L-K L-combs. In an aspect, each L-comb has an associated group of subcarriers that are separated from one another by L-1 subcarriers. The example method also includes demodulating the data on the L-K L-combs.

Furthermore, the disclosure presents another example method performed by a transmitting device that includes generating a signal comprising data to be transmitted to a receiving device during a symbol by modulating the data on L-K L-combs. In an aspect, each L-comb has an associated group of subcarriers that are separated from one another by L-1 subcarriers. The example method also includes transmitting the generated signal to the receiving device (106) during at least a portion of the symbol.

BRIEF DESCRIPTION OF THE FIGURES

FIG. 5 illustrates an OFDM signal that repeats within a nominal OFDM symbol duration that is generated by an OFDM modulator using an Inverse Fast Fourier Transform (IFFT) of half the nominal size.

DETAILED DESCRIPTION

The present disclosure describes example embodiments for mitigating issues with wireless transmissions that overlap with periods of transient transmission power, phase and/or frequency. According to some of these example embodiments, a symbol that at least partly overlaps with a transient period uses a symbol structure that repeats itself within the nominal symbol duration. The receiver (also referred to herein as a receiving device operates on one or multiple repetitions (also referred to herein as copies) that do not overlap with the transient period. Such a repetition can be achieved by modulating only every second (or every n-th) subcarrier. In a generalization it is shown the same method works if not all L L-combs (in an L-comb only every L-th subcarrier is modulated, in total L L-combs with starting subcarrier 0, 1, . . . , L−1 exist) are used. As a result, code blocks transmitted in OFDM symbols overlapping with transient times are better protected, resulting in fewer code block errors and thus fewer transport block errors. This increases throughput and reduced delay.

Figure 1:
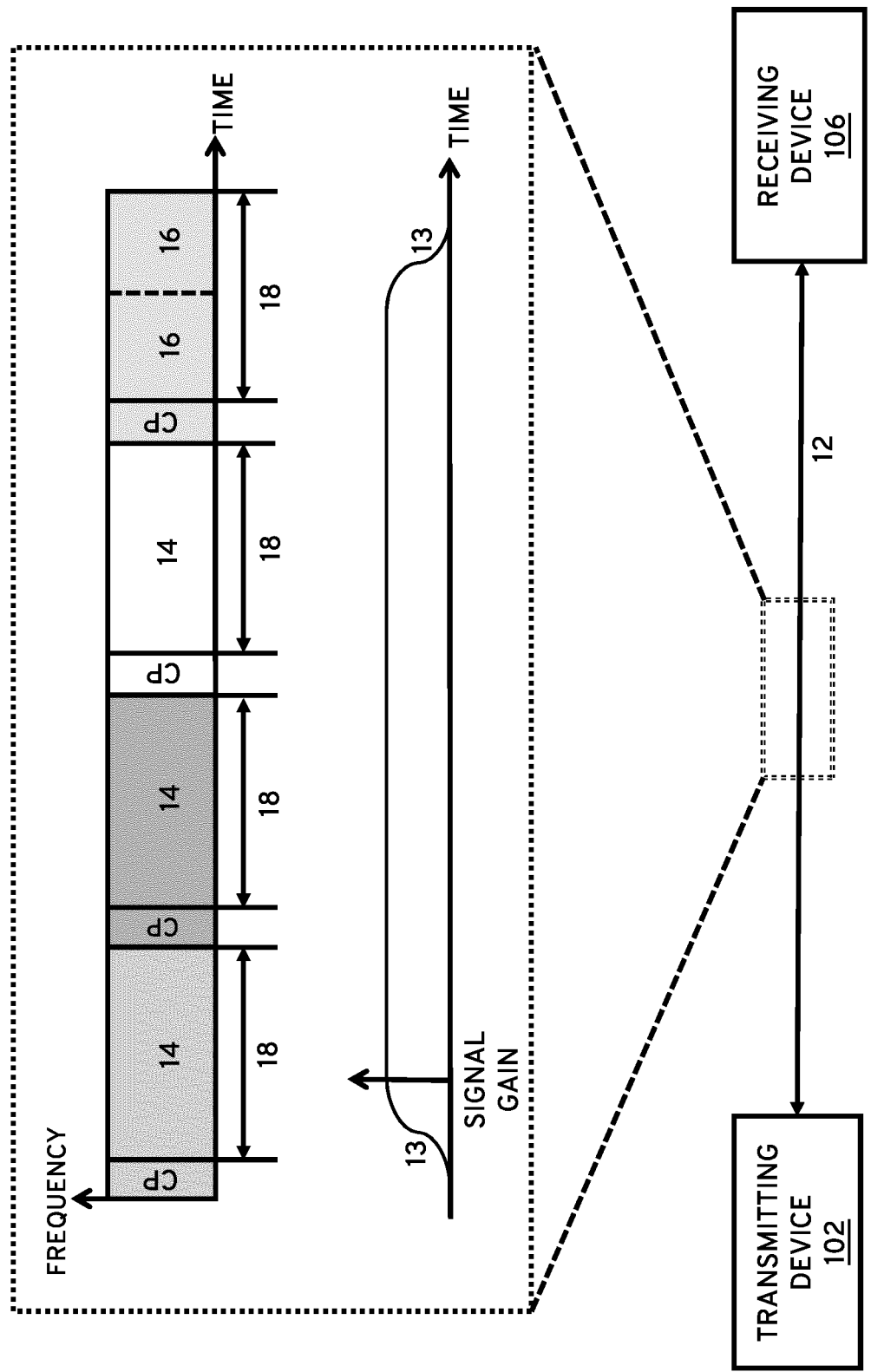
FIG. 1 illustrates a wireless communication system corresponding to example embodiments of the present disclosure.

FIG. 1 illustrates a communication environment 100 that includes a receiving device 106 configured to receive one or more transmissions 12 transmitted by a transmitting device 102. In an aspect, the one or more transmissions 12 may include one or more nominal OFDM symbols 14 having an OFDM symbol duration 18 (referred to also as simply "symbol duration 18" herein). In addition, the one or more transmissions 12 may include one or more OFDM symbols that partially overlap with a transient period 13. The rightmost symbol in the one or more transmissions 12 overlaps with such a transient period 13. As shown in FIG. 1, the transmitting device 102 may generate a copy (or copies) 16 of a symbol that would otherwise overlap (and potentially render the reception of the symbol contents by a receiving device 106 unreliable) if transmitted across the entire nominal OFDM symbol duration as a single OFDM symbol 14. In an aspect, the transmitting device 102 transmits the one or more copies of the symbol contents (i.e. the contents of the original full OFDM symbol) during the nominal OFDM symbol duration 18 (as shown in the rightmost symbol shown in FIG. 1). Accordingly, code blocks transmitted in OFDM symbols overlapping with transient times 13 are better protected from receiver error, resulting in fewer code block errors and thus fewer transport block errors. This increases throughput and reduced delay.

Figure 2:
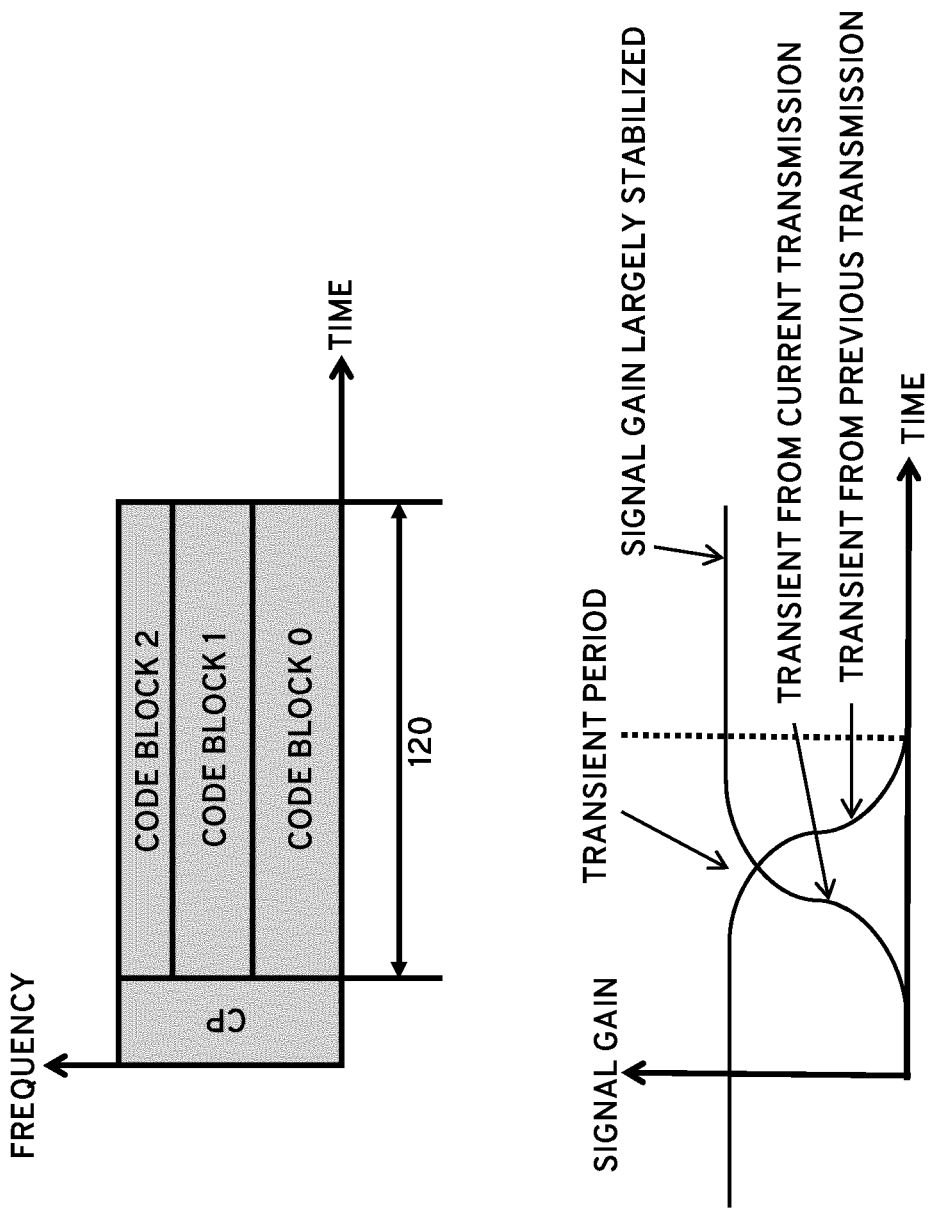
FIG. 2 illustrates parts of an OFDM symbol overlap with a transient period according to aspects of the present disclosure.

FIG. 2 shows a nominal OFDM symbol duration that partly overlaps with a transient time (as described above in the context of FIG. 1). The OFDM symbol carries multiple code blocks. In OFDM information from each subcarrier is spread across the complete symbol, therefore all code blocks in the OFDM symbol overlap the transient time. As shown in FIG. 2, also transients originating from a signal transmitted by a transmitter (i.e., transmitting device 102) during the previous OFDM symbol duration may overlap with current OFDM symbol duration; the transient can come from the same UE due to power changes, frequency hopping or it can come from another UE that e.g. transmitted in the previous symbol duration (in this case FIG. 2 would show the signal at an eNodeB/gNB receiver). The OFDM symbol in FIG. 2 also carries a Cyclic Prefix (CP) as most often used in practical OFDM systems; however, this is not relevant for the invention (the invention works without cyclic prefix, with guard interval instead of cyclic prefix, a unique word, or no guard at all).

Figure 3:
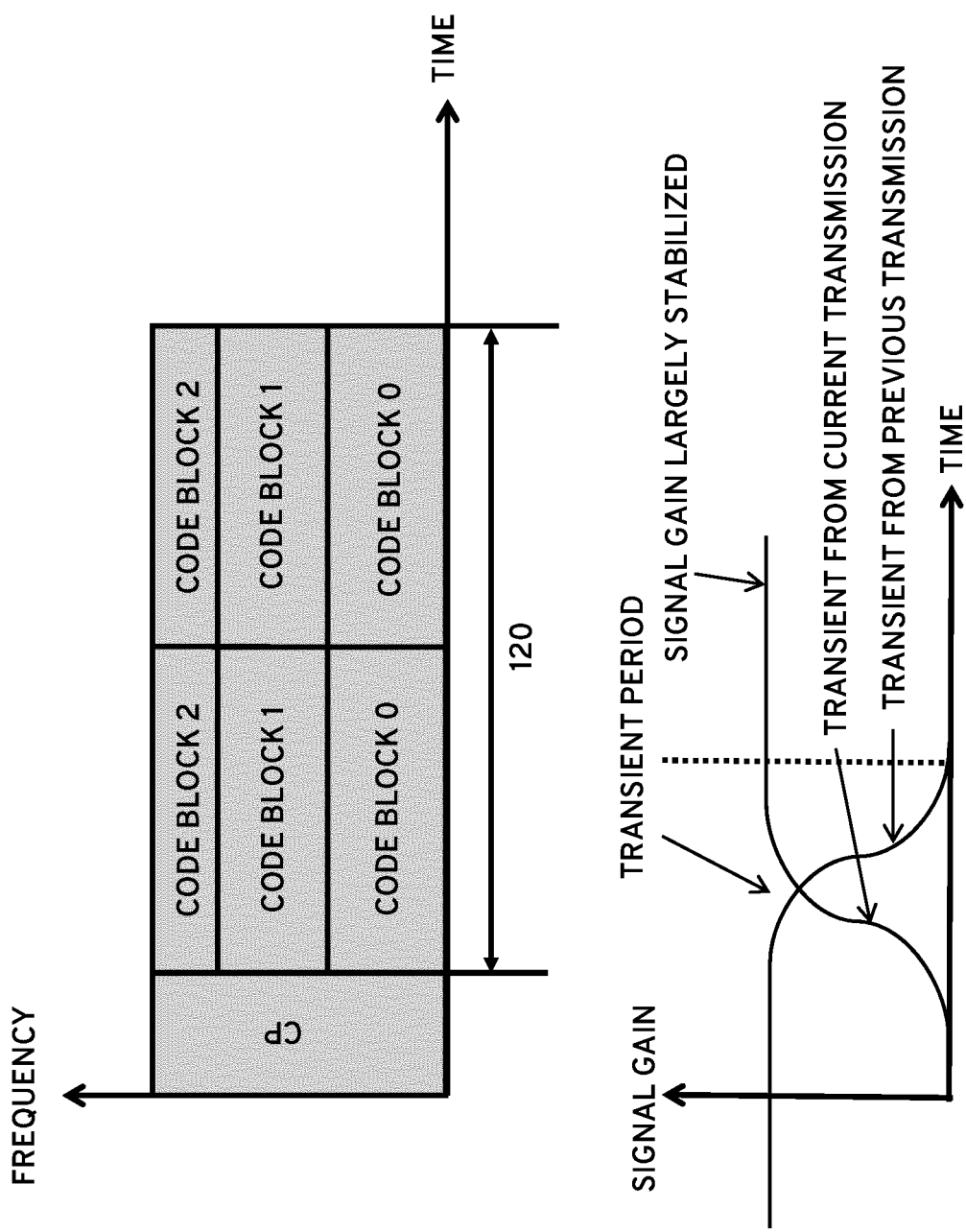
FIG. 3 illustrates parts of an OFDM symbol overlap with a transient period where the OFDM symbol repeats itself twice within a nominal symbol duration and the transient period only overlaps parts of one repetition.
Figure 4:
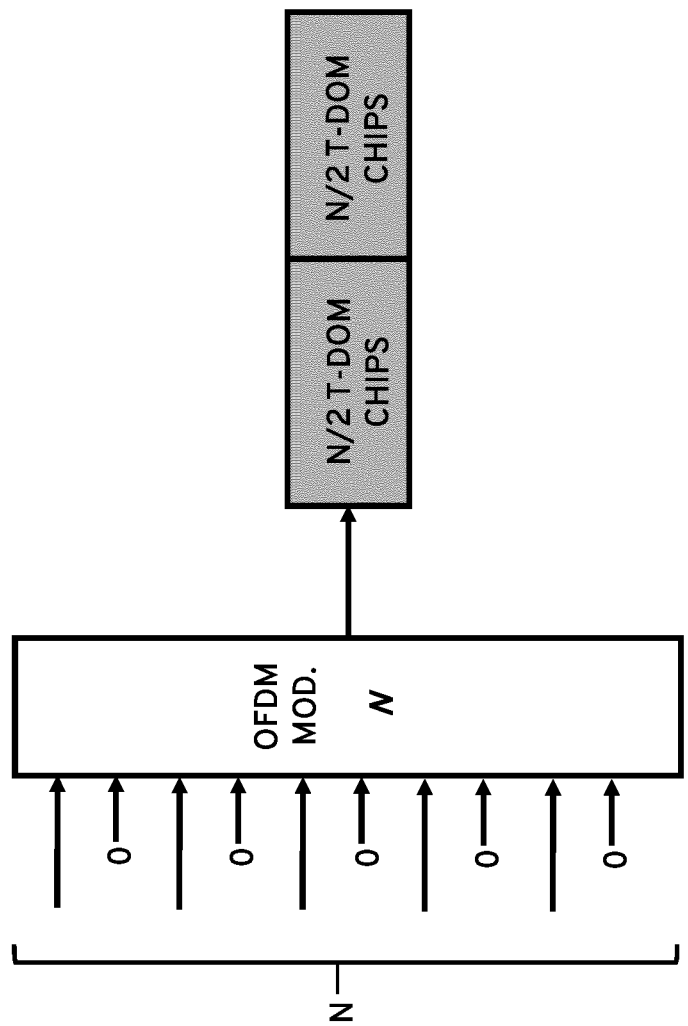
FIG. 4 illustrates parts of an example OFDM signal repeating itself within a nominal OFDM symbol duration and is generated using a nominal OFDM modulator every second subcarrier.

FIG. 3 shows an OFDM symbol that repeats itself twice within a nominal OFDM symbol duration. Also, in this example, the OFDM symbol carriers a cyclic prefix. In an aspect, for instance, as illustrated in FIG. 4, this repeating can be achieved by using an OFDM modulator of same size (IFFT size) as used for nominal OFDM symbols but only using every second subcarrier. Alternatively or additionally, an OFDM modulator with a half-size IFFT can be utilized and the signal can be repeated, as also illustrated by FIG. 4. As can be seen, the figure shows that a transient period overlaps the beginning of the OFDM symbol period, the solution outlined below works also for the example use-case where the transient overlaps the end of the OFDM symbol duration.

A transient can of course also partly overlap such that it is partly outside and partly within the symbol duration. In FIG. 3, only one of the repetitions partly overlaps with the transients. If the receiver (also referred to herein as receiving device 106 in some examples) processes the second part of the symbol, and therefore no transients impair the reception of the signal. If transients do occur at the end of the symbol, however, the first symbol part can be processed in place of the symbol portion that overlaps the transient portion.

Figure 6A:
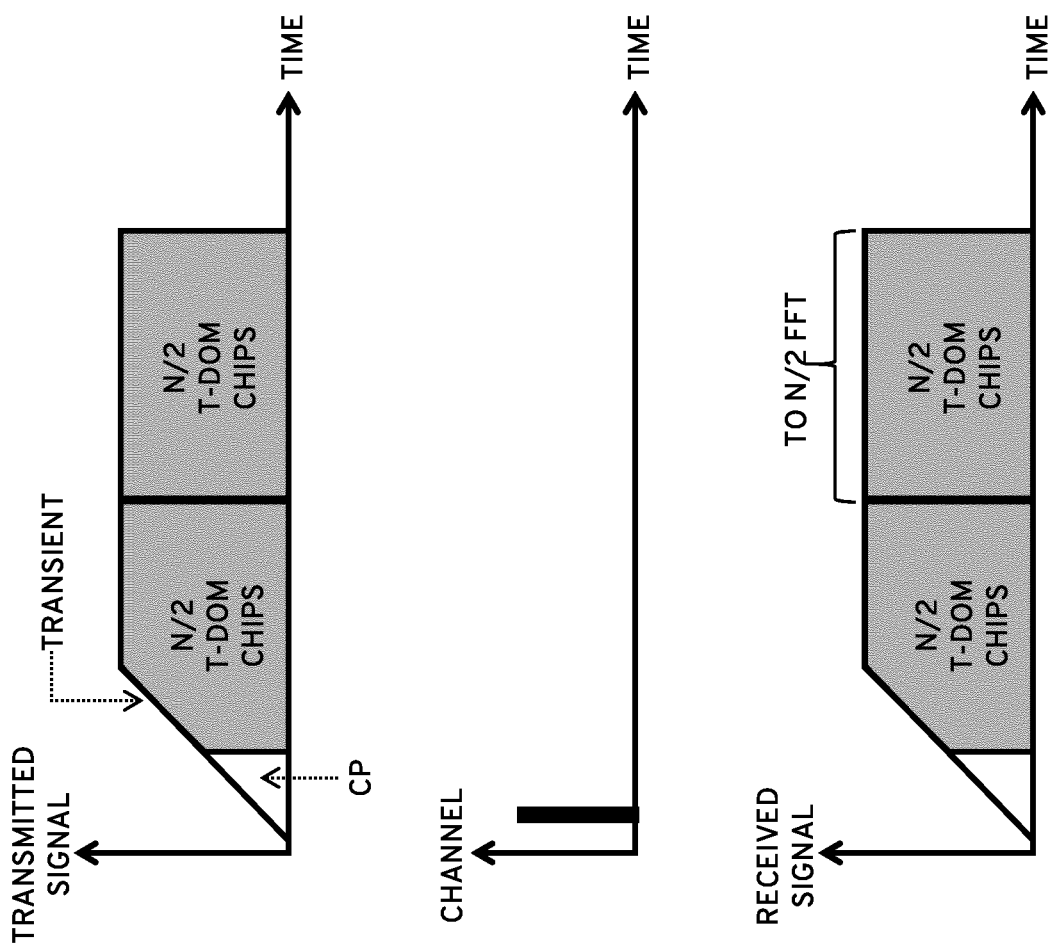
FIG. 6A illustrates an example embodiment wherein a receiving device uses a Fast Fourier Transform (FFT) of half the nominal size and processes only the second half of the received OFDM symbol.
Figure 6B:
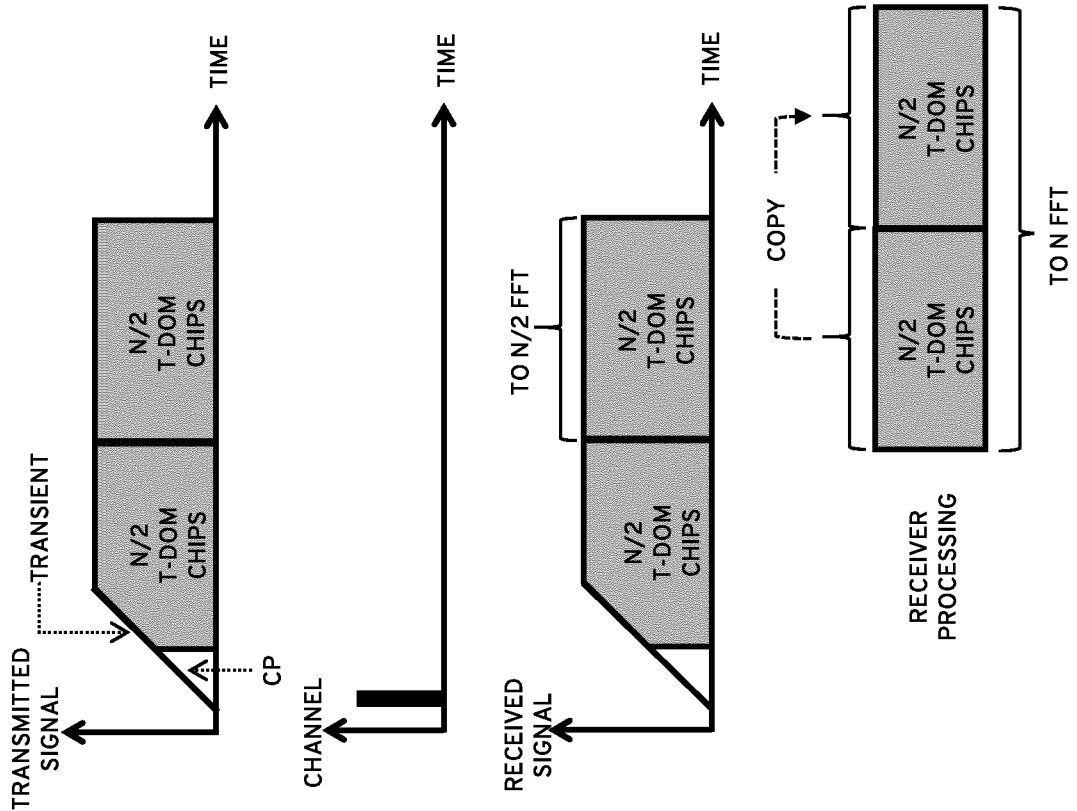
FIG. 6B illustrates an example embodiment wherein a receiving device uses the second half of the received OFDM symbol to obtain a symbol with nominal time duration and discards every second subcarrier.
Figure 16:
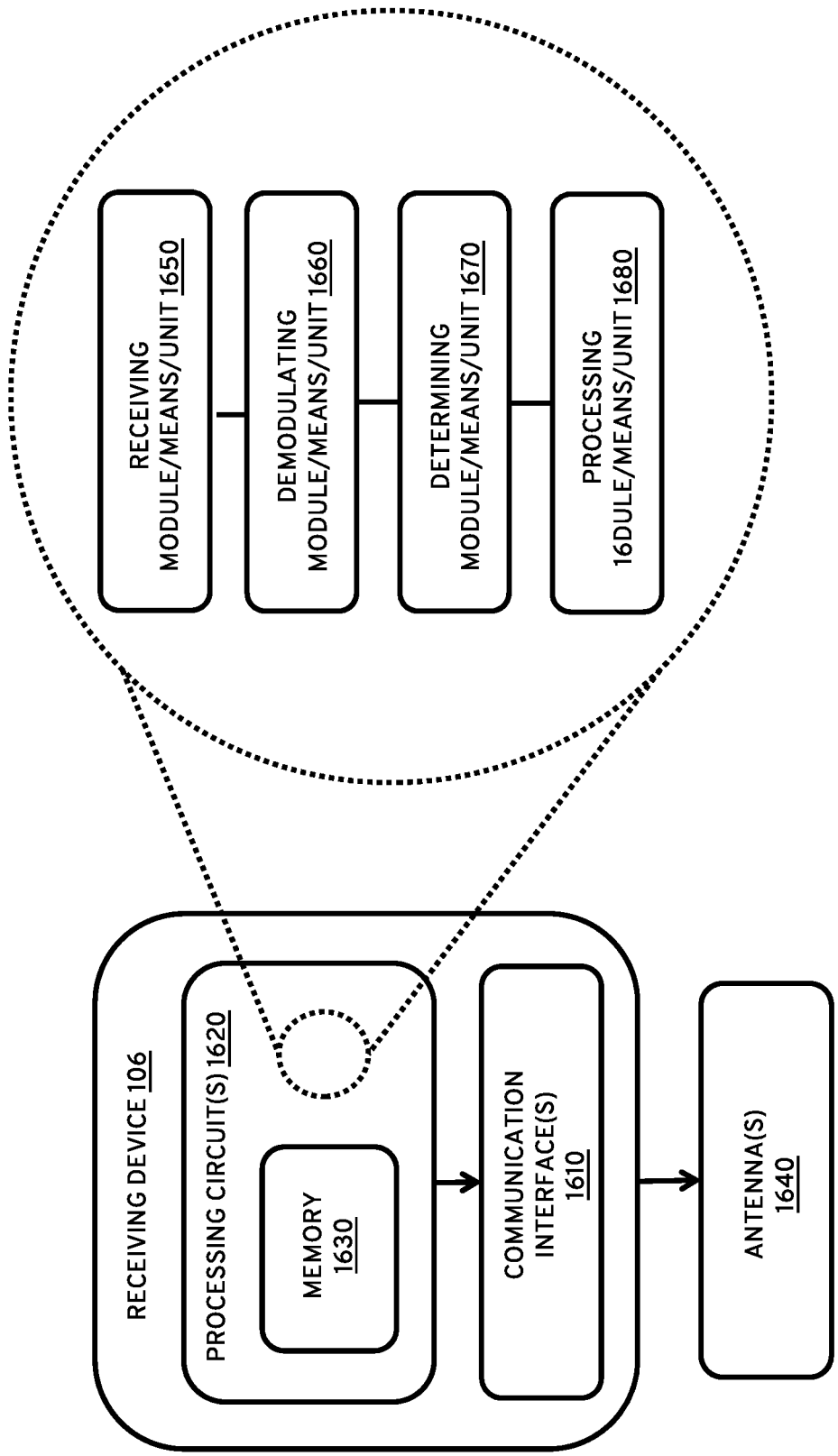
FIG. 16 illustrates details of an example receiving device according to one or more embodiments.

The top rows in FIGS. 6A and 6B show a transmitted signal with transients overlapping a first portion of the transmitted signal. The middle diagrams in FIGS. 6A and 6B illustrate wireless channel, which in the simplified example illustrated in these figures, is simply a delay. The diagrams in the bottom row of FIGS. 6A and 6B illustrate the received signals as felt by the receiving device 106, which are delayed by the channel, per the illustrated channel diagram above it. In an aspect of the present disclosure, the receiver processes the second duration of the received OFDM symbol. Thereafter, the receiver can use an FFT size corresponding to half the symbol duration. Alternatively or additionally, the receiving device 105 can effectively "cut out" the second signal part and repeat it, can utilize a nominal FFT size, and can ultimately use only every second subcarrier of the output. These alternatives are illustrated in FIGS. 4 and 16, respectively.

Figure 7:
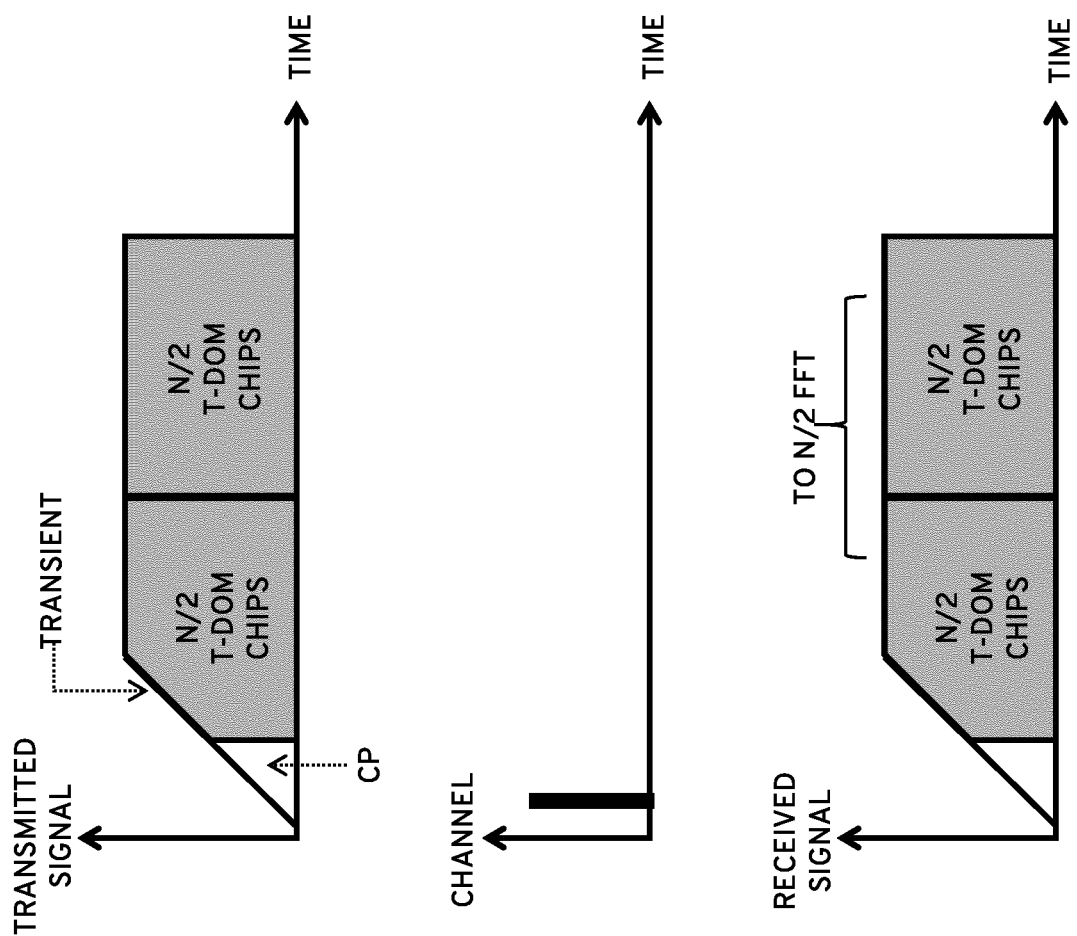
FIG. 7 illustrates an example embodiment wherein a receiving device can operate on any symbol part of half the nominal OFDM symbol duration.

In addition to cutting out the second symbol portion "exactly" (i.e. the second or "later" set of symbols, shown as the rightmost set of N/2 time domain, T-DOM, chips introduced in FIGS. 6A and 6B), a receiver or receiving device 106 is not required process the any given "half" or "portion" of a frame (i.e., as defined by the standard subframe/symbol timing structure). Instead, it can "cut out" any half nominal symbol duration as shown in FIG. 7. This is typically done over a more complex wireless channel than a just a delay where the optimum sync position can be different. In this case however the receiver needs to compensate for the time delay between cut out signal portion and OFDM symbol boundary. This processing can also be of interest if a transient period overlaps beginning and end of the OFDM symbol duration.

In above description, the signal is repeated twice within a nominal OFDM symbol duration. Other repetition factors can be used as well by either using every L-th subcarriers of a nominal OFDM symbol or using an OFDM modulator of size 1/L-th the nominal OFDM modulator size and copying the result several times.

Since only half as many (or 1/L-th) resource elements can be modulated with independent symbols during a nominal OFDM symbol duration the coded bits that can be transmitted is of course only one half (1/L-th). However, it can be better to transmit half as many (1/L-th) coded bits reliable than twice as many very unreliable.

For a 1-symbol transmission where transients overlap both symbol ends the receiver would operate on the symbol part as shown in the middle row diagram of FIG. 7. For transmissions that contain multiple OFDM symbols the OFDM symbols with repetition need only to be transmitted at the beginning and/or end which overlap with a transient.

Figure 8:
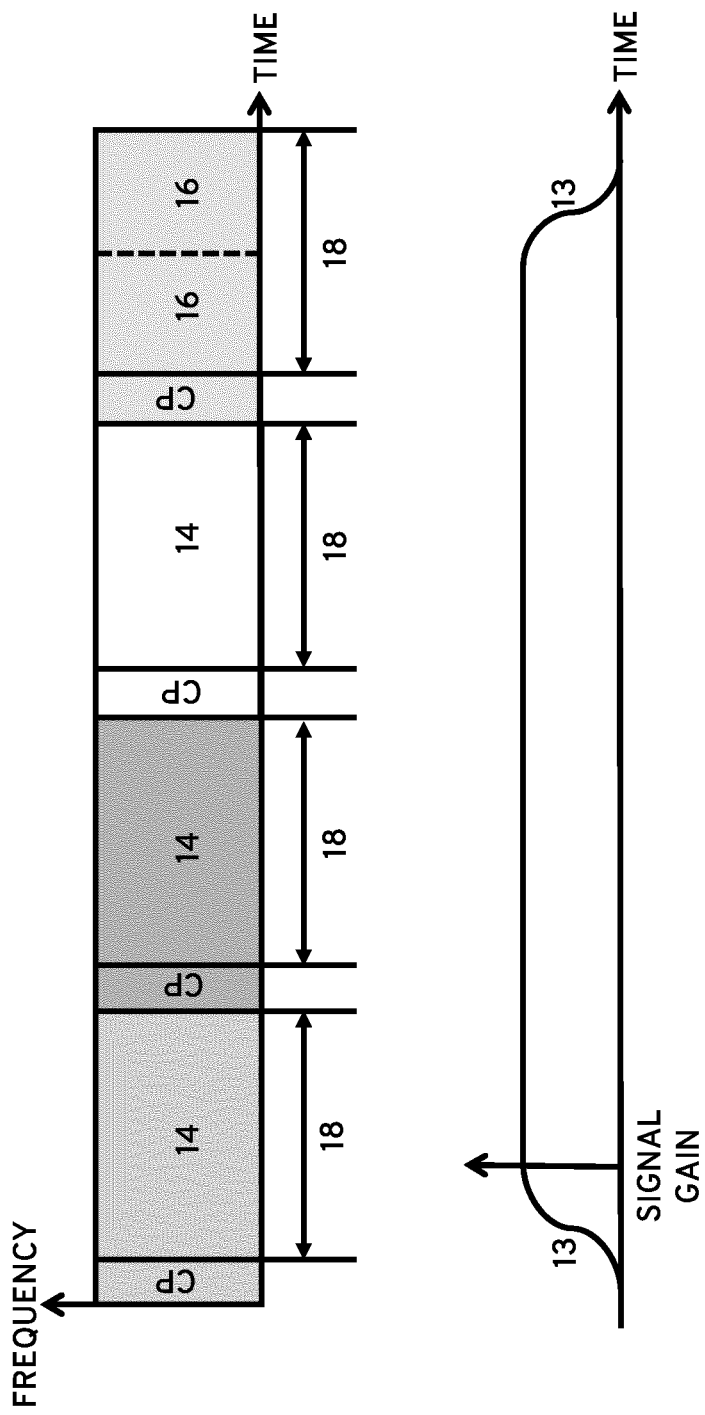
FIG. 8 illustrates an example transmission with four OFDM symbols wherein decaying transient overlaps with the last OFDM symbol and the last OFDM symbol effectively repeats itself.

In FIG. 8, a transmission containing 4 OFDM symbols is shown, whereby the rising transient happens before the first OFDM symbol and the decaying transient overlaps with end of the last OFDM symbol. In this example, the first the OFDM symbols are regular OFDM symbols while the last OFDM symbol is constructed to repeat itself.

Figure 9:
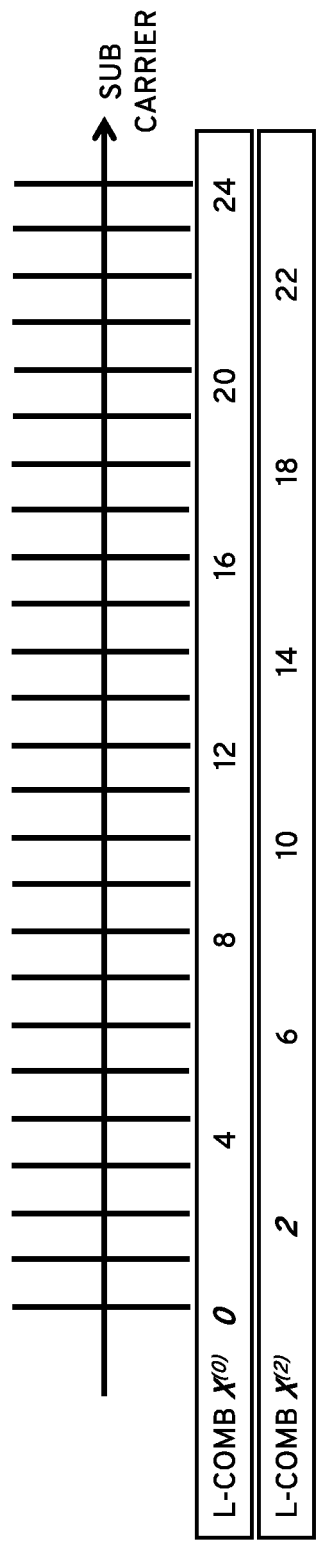
FIG. 9 illustrates example arrangements of L-combs $X^{(0)}$ and $X^{(2)}$.

The problem has been laid out with a data symbol using frequency-first mapping. However, the problem applies to any kind of multi-carrier symbol, e.g. data (where frequency-first mapping is more sensitive than time-first mapping, reference signal symbols, control channel symbols, etc). In some examples, the one or more copies can be generated by using every $L^{th}$ subcarrier (i.e., every other subcarrier where L=2). In other words, data X transmitted over N subcarriers can be organized into L L-combs, i.e. $X^{(l)}=[X_l, X_{l+L}, \ldots, X_{l+N-L}]$, l=0,1, ..., L−1. An example of this can be seen in FIG. 9, which shows a data symbol $X_k$ modulated on subcarrier k. In other examples, the one or more copies 16 can be generated by using any set of subcarriers (i.e., including one or more subcarrier sets containing subcarriers that are not evenly distributed across the N subcarriers).

The generated time-domain signal is generated in OFDM as the IDFT of the frequency-domain data vector, i.e. $x_n=\text{IDF}\{X_k\}[n]$. If a UE does not transmit over all N subcarriers the unused subcarriers are set to 0 (in an efficient implementation a simplified IFFT might be used).

Figure 10:
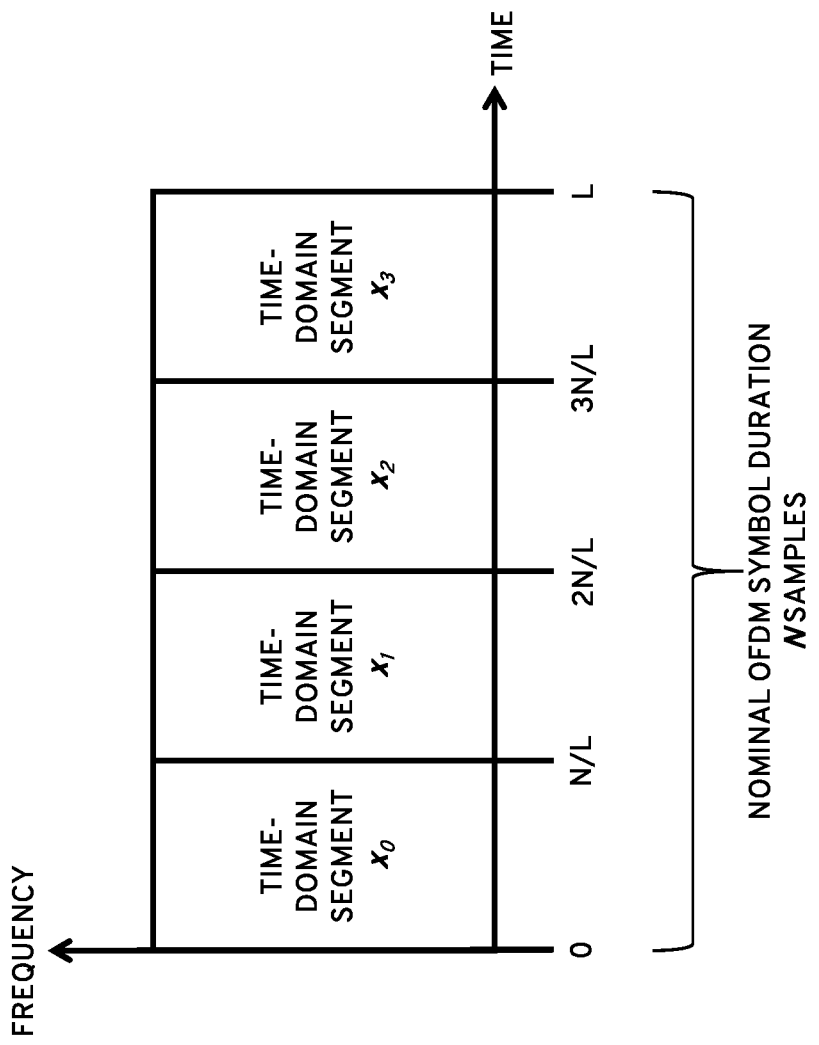
FIG. 10 illustrates an example embodiment wherein a time-domain signal is organized into time-domain segments $x^{(l)}$ for l=0, 1, 2, and 3.

The transmitted signal x (represented by the vector x) can be organized into L time-domain segments of length N/L, $x_r=x [x_{rN/L} x_{rN/L+1} \ldots x_{(r+1)N/L-1}]$, which is illustrated in FIG. 10. If the receiver is unable use up to K time-domain segments (for example, if a quantum of time-domain segments are destroyed by transients), the transmitter can modulate at most L−K L-combs. The disclosure elaborates further below regarding how the receiver can recover the information contained in the modulated L-combs when up to K time-domain segments of the signal have been destroyed.

To summarize, embodiments may leave K L-combs unmodulated in the OFDM modulator, which enables the receiver to receive the data contained in the modulated combs even if up to K time-domain segments cannot be used during reception as a result of the presence of transients during those time segments. For purposes of the present disclosure, L L-combs represents a total number of L-combs for a particular symbol, whereas K L-combs comprises a number of L-combs whose associated subcarriers are not to be modulated by the transmitting device 102. Furthermore, in an aspect of the present disclosure that will be further touched upon and described more fully throughout the paragraphs that follow, each of the L L-combs and the K L-combs may have an associated group of subcarriers that are separated from one another, for instance, by L−1 subcarriers.

The advantage of this method over the two-repetition method is finer granularity: The two-repetition method protects against transient of half the nominal OFDM symbol duration (often much shorter durations would be sufficient), but reduces the number of useable subcarriers to half. In some situations, such as where the transient overlap does not approach half of the nominal OFDM symbol duration, the two-repetition model effectively has a built-in opportunity cost that can be solved with greater granularity. These more granular example embodiments, further described below, enable protection against transient of K/L of the nominal OFDM symbol duration and reduced the number of useable subcarriers only by K N/L. For instance, if the transient period is shorter than 1/L-th of the nominal OFDM symbol duration K=1 is sufficient resulting in only N/L lost subcarriers.

The relation in OFDM between frequency-domain data vector and time-domain signal is an IDFT. The time-domain segment $x_r^{(l)}$ generated by L-comb $X^{(l)}$ can be written as $$[x_r^{(l)}]_n = x_{rN/L+n}^{(l)} =$$

$$\frac{1}{N}\sum_{k=0}^{N/L-1}[X^{(l)}]_k e^{j2\pi/N(l+kL)(rN/L+n)} = \frac{1}{L}e^{j2\pi/Lrl}e^{j2\pi/Nln}IDFT\{X^{(l)}\}[n],$$

$$n = 0, 1, \ldots, \frac{N}{L}-1.$$

The exponential $e^{j2\pi/Nln}$ does not depend on the time-domain segment index r. In other words, the vector $[s^{(l)}]_n = 1/L \, e^{j2\pi/Nln} IDFT\{X^{(l)}\}[n]$, $n=0, 1, \ldots, N/L-1$, is the same for all L time-domain segments. What differs between the different time-domain segments is the sequence $e^{j2\pi/Lrl}$—which depends on the time-domain segment index r. Thus, the time-domain segment $x_r^{(l)}$ becomes $$[x_r^{(l)}]_n = e^{j2\pi/Lrl}[s^{(l)}]_n,$$

n=0, 1, . . . , N/L−1; l=0, 1, . . . , L−1,

This is further illustrated in reference to FIG. 10, which shows Time-domain segments $x_r^{(l)}$ or l=0, 1, 2, 3. L=4. The time-domain segment $x_r$ due to all L L-combs $X^{(l)}$ is the sum over all L $x_r^{(l)}$ which can be written in matrix notation as $$x_r = Sv_r,$$

with $S=[s^{(0)} \, s^{(1)} \, \ldots \, s^{(L-1)}]$ and $[v_r]_l = e^{j2\pi/Lrl}$, l=0, 1, . . . , L−1. All L time-domain segments $x_r$ (which, when concatenated, provide the complete time-domain sequence x of an OFDM symbol) stacked column-wise in matrix X can be expressed as $$X=[x_0 x_1 \ldots x_{L-1}]=SV$$

where $[V]_{lr}=e^{j2\pi/Lrl}$, 1, r=0, 1, . . . , L−1, the complex conjugate DFT matrix of size L. The equation above describes the relation between time-domain segments (contained in X) and L-combs (contained in S).

The receiver (also referred to herein as receiving device 106, see, e.g., FIG. 1) receives the signal x over a channel. This transmitted signal, which will experience distortion and interference along its path, is denoted y. Obviously, with an ideal channel we would have y=x and Y=X. As previously mentioned, however, signal y experiences distortions by the channel as well as transients and other disturbances, so the more realistic assumption in the field is that the channel is not ideal for purposes of the propagation of signal y. For the moment, however, let us assume an ideal channel (i.e., y/x=1) and focus on the impact of transients and other disturbances that make certain time-domain segments of the received signal unusable. If the receiver cannot use certain time-domain segments, for instance, as a result of transient overlap, this is modeled by removing the columns in Y corresponding to those segments, and if K time-domain segments are unusable the corresponding K columns are removed from Y. For example, with L=4 and K=1 discarded time-domain segment (and thus only 3 used 4-combs) the time duration of a transient or other disturbance should not exceed a quarter of the nominal OFDM symbol duration (the duration of a time-domain segment).

Since the receiver only has N−NK/L independent time-domain samples for processing it can at most recover N−NK/L modulation symbols. As stated above, if up to K time-domain segments are unusable, K L-combs can be left unmodulated to compensate. In principal, it does not matter which K L-combs are left unmodulated. With that said, some clever choices may lead to simpler receiver processing. Furthermore, the transmitter (i.e., the transmitting device 102) and receiver (i.e., the receiving device 106) should agree on the unused L-combs. Unused L-combs $X^{(l)}$ are considered in the receiver by removing the corresponding K columns from S, and the resultant column-reduced matrix is denoted $\bar{S}$. It should be noted that the number of unused L-combs $X^{(l)}$ is not required to be the same as the number of unusable time-domain segments—but could in fact be larger, however, for the sake of simplicity, we assume both numbers are equal to K, though this is a non-limiting aspect. Using equation X=SV again, but replacing X by Y (which has been column reduced) and S by $\bar{S}$, one obtains the following relationship:

$$Y=\bar{S}\bar{V}$$

Matrix $\bar{V}$ is derived from V by removing the same rows as columns in $\bar{S}$ and the same columns as in Y. This equation can be solved after $\bar{S}$ (which contains information corresponding to the modulated L-combs $X^{(l)}$) with $$\bar{S}=Y((\bar{V})^T)^{-1})^T$$

Note, as well, that in case of non-square $\bar{V}$ the pseudo-inverse is used. The above equation essentially establishes that for each L-comb $X^{(l)}$, time-domain segments contained in the columns of Y should be linearly combined with weights given by the elements of matrix of $(((\bar{V})^T)^{-1})^T$.

The columns in $\bar{S}$ are the $s^{(l)}$ corresponding to modulated L-combs $X^{(l)}$. From $s^{(l)}$ estimates of the transmitted modulation symbols of L-comb $X^{(l)}$ can easily be calculated by solving formula $[s^{(l)}]_n = 1/L \, e^{j2\pi/Nln} IDFT\{Y^{(l)}\}[n]$, l=0, 1, N/L−1 for $Y^{(l)}$.

If the channel is not ideal but time-dispersive linear distortions are introduced. If a cyclic prefix has been inserted before the symbol (or any other prefixing or guard insertion method as known in state of the art) the complex quantities received on L-comb $Y^{(l)}$ are not $X^{(l)}$ but $X^{(l)}$ weighted by the frequency-domain channel transfer function. To undo the channel impact standard OFDM receiver processing such as equalization, considering the channel transfer function during decoding and the like can be applied.

Thus, so far it has been assumed that K L-combs are left unmodulated. However, in a generalization these K L-combs are modulated with same modulation symbols as used on modulated L-combs or linear combinations thereof (the different K L-combs can be modulated by the same or different modulation symbols).

The following constitute non-limiting examples of the techniques described above. First, in a scenario where L=4 time-domain segments, the last time-domain segment is discarded, and L-comb $X^{(3)}$ is not modulated, the combining matrix becomes:

$$(((\overline{V})^T)^{-1})^T = \begin{pmatrix} 0.25 - 0.25j & 0.5 & 0.25 + 0.25j \\ 0.5 & 0 & -0.5 \\ 0.25 + 0.25j & -0.5 & 0.25 - 0.25j \end{pmatrix}$$

In a further scenario, involving L=4 time-domain segments, where the first time-domain segment is discarded and L-comb $X^{(3)}$ is not modulated, the combining matrix becomes:

$$(((\overline{V})^T)^{-1})^T = \begin{pmatrix} 0.25 - 0.25j & -0.5j & -0.25 - 0.25j \\ 0.5 & 0 & 0.5 \\ 0.25 + 0.25j & 0.5j & -0.25 + 0.25j \end{pmatrix}$$

In another example, where there exist L=4 time-domain segments, the first and last time-domain segments are discarded, and L-combs $X^{(1)}$ and $X^{(3)}$ not modulated, the combining matrix becomes:

$$(((\overline{V})^T)^{-1})^T = \begin{pmatrix} 0.5 & -0.5 \\ 0.5 & 0.5 \end{pmatrix}$$

Likewise, in a scenario where there are L=2 time-domain segments, the first time-domain segment is discarded, and L-comb $X^{(1)}$ not modulated, the combining matrix becomes:

$(((V)^T)^{-1})^T = (1)$

This is consistent with the two-repetition case where the receiver only processes the undisturbed repetition.

Therefore, according to example techniques presented herein, in an OFDM symbol, not all L-combs are modulated (in an L-comb only every L-th subcarrier is modulated, in total L L-combs with starting subcarrier 0, 1, ..., L−1 exist). If, for instance, one such L-comb is left unmodulated, the receiver can demodulate the signal even though 1/L-th of the nominal OFDM symbol duration cannot be used for demodulation. One case shown throughout the disclosure (and by no means limiting) is that an OFDM symbol is made to repeat itself twice within a nominal OFDM symbol duration by using only every second subcarrier. Thus, these techniques enable reception of an OFDM symbol despite some parts have been partially or fully destroyed by transients (in power/phase/frequency/etc.). However, it should be noted that the proposed embodiments described herein can be applied to transmission/reception of partly impaired OFDM symbols with any kind of impairment.

In addition, see the example embodiments below and example methods 1100, 1200, 1300, and 1400 in FIGS. 11-14, respectively, for additional details regarding the specifics of example implementations. Furthermore, each of the transmitting device 102 and/or receiving device 106 can constitute a UE, core network node, and radio access network node, and can perform the functions/aspects described herein in some capacity. Thus, for purposes of the present disclosure, when referring to a generic "device" as in FIG. 16, that device can refer to any of these specific devices.

Figure 11:
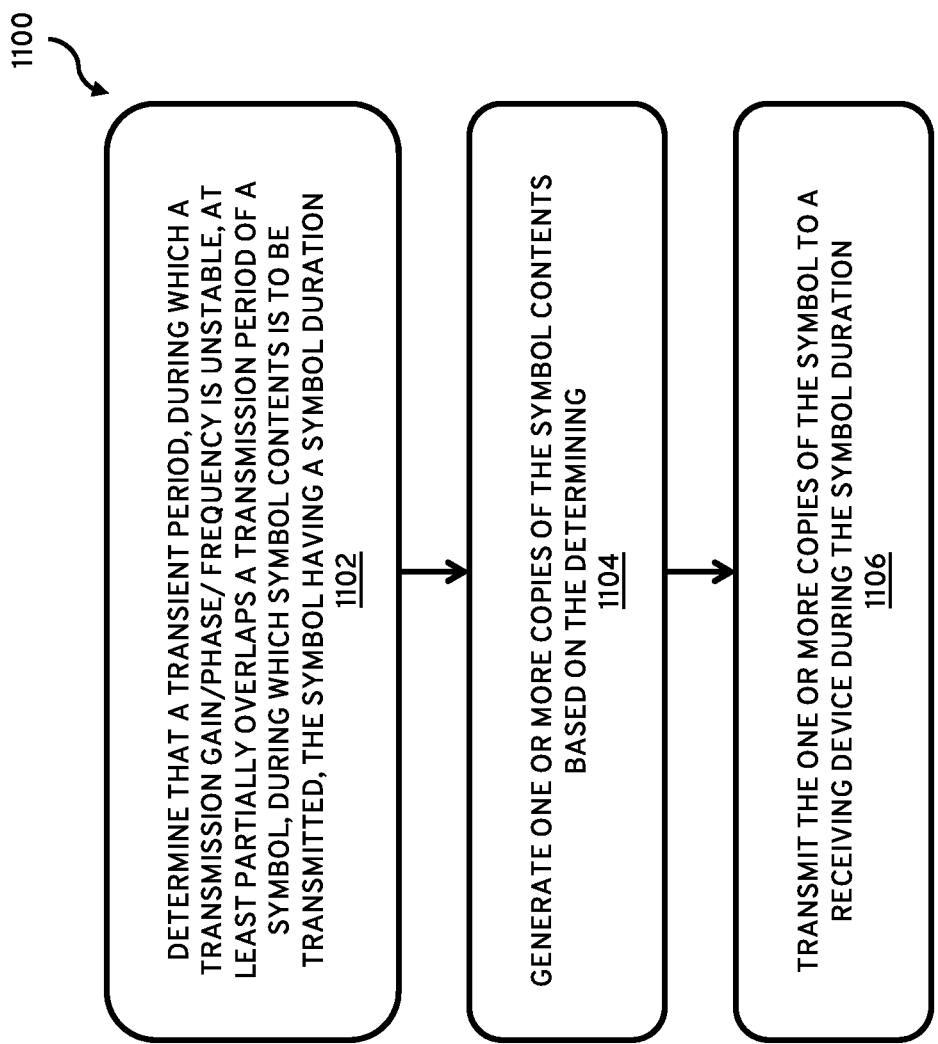
FIG. 11 illustrates a method performed by a transmitting device (UE, network node, etc.) according to one or more embodiments.

FIG. 11 illustrates an exemplary method 1100 performed by a transmitting device 102 according to the present disclosure. For instance, method 1100 may include, at block 1102, determining that a transient period, during which a transmission gain/phase/frequency is unstable, at least partially overlaps a transmission period of a symbol, during which symbol contents is to be transmitted, the symbol having a symbol duration. In addition, at block 1104, method 1100 may include the transmitting device 102 generating one or more copies of the symbol contents (in some instances, based on the determining). Furthermore, method 1100 may include, at block 1106, transmitting the one or more copies of the symbol to a receiving device 106 during the symbol duration.

In addition, though not explicitly shown in FIG. 11, method 1100 may include one or more additional or alternative embodiments, which follow. For instance, in method 1100, generating the one or more copies of the symbol contents may include generating the one or more copies such that at least one of the copies does not overlap the transient period. In addition, generating the one or more copies of the symbol contents may include generating the one or more copies by an OFDM modulator using an IFFT having a size of half that of a nominal OFDM symbol. More generally, generating the one or more copies of the symbol contents may include generating n copies by an OFDM modulator using an IFFT having a size of 1/n that of a nominal OFDM symbol.

In further example embodiments, method 1100 can include determining that a disturbance is less than half of the transmission of the signal, and based on such a determination, one 2-comb is generated and transmitted. Likewise, if it is determined that a disturbance is less than a quarter of the transmission of the signal, three 4-combs can be generated and transmitted.

Figure 12:
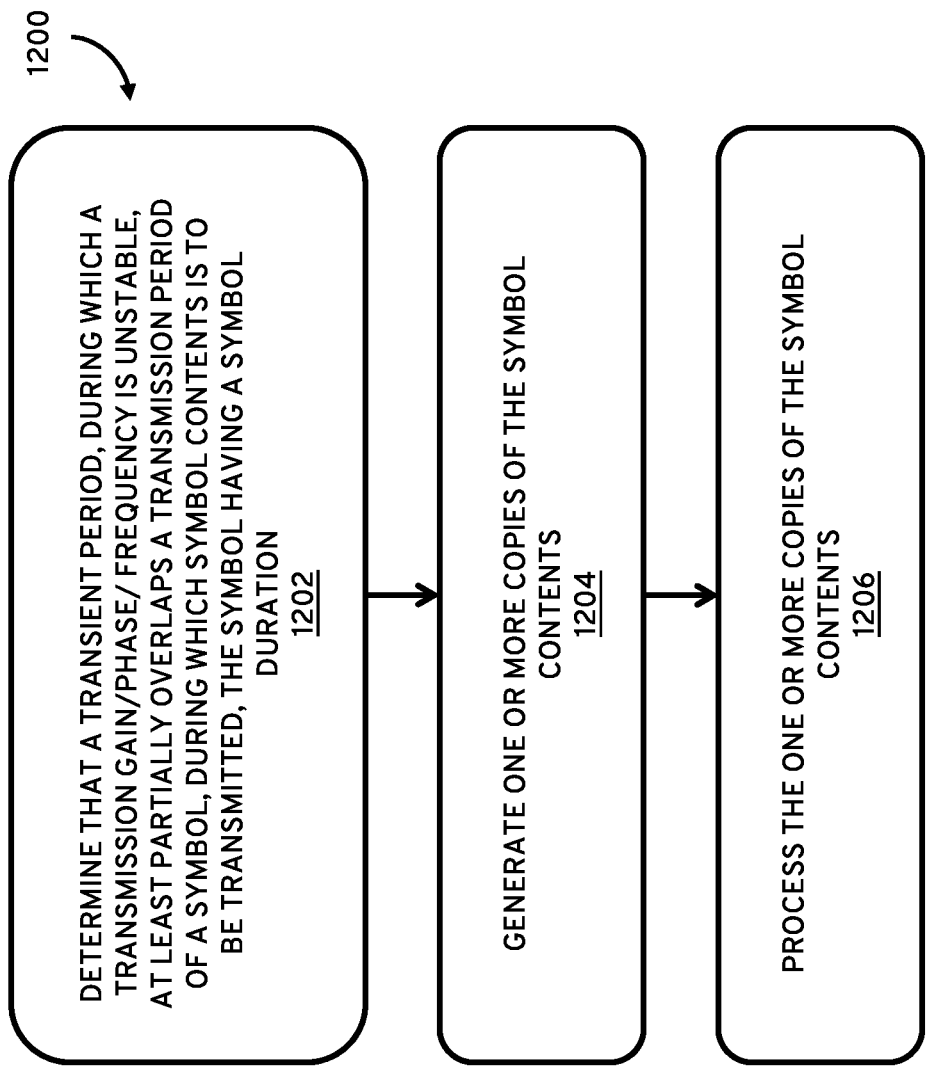
FIG. 12 illustrates a method performed by a receiving device (UE, network node, etc.) according to one or more embodiments.

FIG. 12 illustrates an exemplary method 1200 performed by a receiving device 106 according to the present disclosure. For instance, method 1200 may include, at block 208, determining that a transient period, during which a transmission gain/phase/frequency is unstable, at least partially overlaps a transmission period of a symbol, during which symbol contents is to be transmitted, the symbol having a symbol duration. In addition, method 1200 may include, at block 210, receiving one or more copies of the symbol contents based on the determining. Furthermore, method 1200 may include, at block 1502, processing the one or more copies of the symbol contents.

In addition, though not explicitly shown in FIG. 12, method 1200 may include one or more additional or alternative embodiments, which follow. For instance, in method 1200, processing the one or more copies of the symbol contents comprises using an FFT of a size of half that of a nominal OFDM symbol and processing only the unimpaired half of the received OFDM symbol. More generally, instead of half i.e. ½, it may be the case that a factor of 1/n is utilized in the sizing of the FFT relative to the nominal OFDM symbol for processing purposes. In an aspect, processing the one or more copies of the symbol contents may include replicating one of the received one or more copies (part of the received OFDM symbol) to obtain a symbol having a nominal OFDM symbol time duration, and may also include utilizing an FFT of a nominal OFDM symbol to process the replicated copies having the nominal OFDM symbol time duration by discarding every nth subcarrier, where the one or more copies comprise n copies.

Furthermore, in certain example embodiments, demodulating the data at the receiving device 106 on the L–K L-combs can include dividing a received signal into sub-blocks, and may include processing a subset of said sub-blocks. In a further example aspect, the receiving device 106 demodulating the data on the L–K L-combs can include linearly combining the subset of said sub-blocks.

Figure 13:
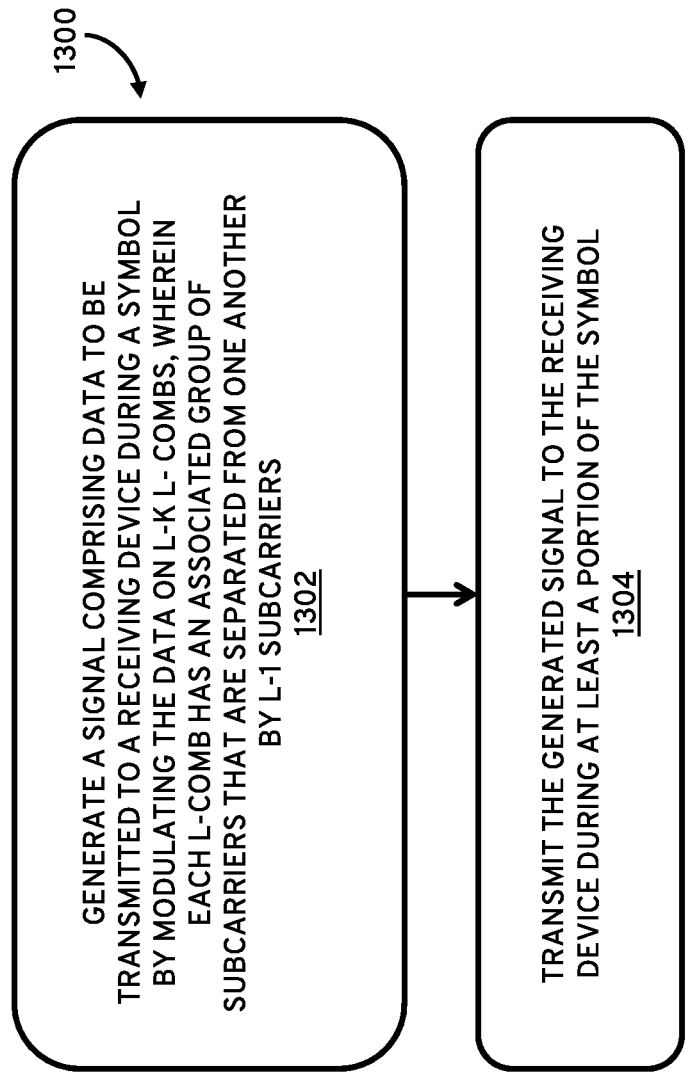
FIG. 13 illustrates a method performed by a transmitting device (UE, network node, etc.) according to one or more embodiments.

FIG. 13 illustrates an exemplary method 1300 performed by a transmitting device 102 according to the present disclosure. For instance, method 1300 may include, at block 1302, generating a signal comprising data to be transmitted to a receiving device 106 during a symbol by modulating the data on L–K L-combs, where each L-comb has an associated group of subcarriers that are separated from one another by L–1 subcarriers. In addition, at block 1304, method 1300 includes transmitting the generated signal to the receiving device 106 during at least a portion of the symbol.

Further, although not explicitly shown in FIG. 13, method 1300 may include further aspects. For instance, method 1300 may include determining a need to modulate the data on the L–K L-combs based on a disturbance in one or more parameters affecting the transmission of the signal. In some examples, the disturbance comprises a disturbance in interference level, transmission power gain, transmission frequency, and/or transmission phase, and may correspond to the transient period discussed throughout the present disclosure. In some examples, generating the signal may further include zeroing modulation of the data on one or more subcarriers that are not on the L–K L-combs. Zeroing the modulation of the data may include zeroing modulation of the data on subcarriers associated with said K L-combs.

Furthermore, in some examples, modulating the data on the L–K L-combs and transmitting the signal is associated with a special transmission mode different from a full subcarrier transmission mode, the full subcarrier transmission mode comprising modulating and transmitting the data on each available subcarrier for the symbol. The special transmission mode may be utilized where a transient period of changing interference, transmission power, gain, and/or phase, overlaps transmission resources during the full subcarrier transmission mode. In addition, any of the aspects discussed in reference to example method 1100 of FIG. 11 can, in some examples, also be performed by the transmitting device 102 in method 1300 of FIG. 13.

Figure 14:
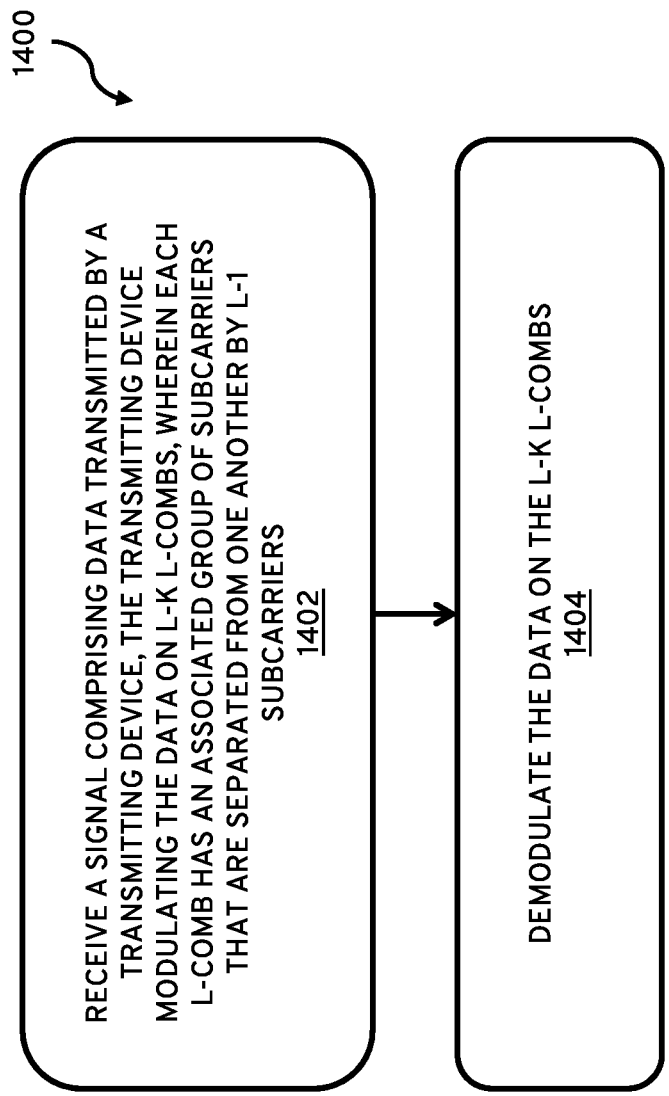
FIG. 14 illustrates a method performed by a receiving device (UE, network node, etc.) according to one or more embodiments.

FIG. 14 illustrates an exemplary method 1500 performed by a receiving device 106 according to the present disclosure. For instance, method 1500 may include, at block 1402, receiving a signal comprising data transmitted by a transmitting device 102, the transmitting device 102 modulating the data on L–K L-combs, where each L-comb has an associated group of subcarriers that are separated from one another by L–1 subcarriers. In addition, at block 1404, method 1500 may include demodulating the data on the L–K L-combs. Furthermore, although not explicitly shown in FIG. 14, method 1500 may include further and/or alternative aspects. For instance, in some examples, a portion of the symbol overlaps a disturbance in one or more parameters affecting the transmission and/or reception of the signal. In some examples, the disturbance includes a disturbance in interference level, transmission or reception power gain, and/or transmission or reception phase of the received signal, and in some instances may correspond to the transient period described throughout the present disclosure.

In addition, any of the aspects discussed in reference to example method 1200 of FIG. 12 can, in some examples, also be performed by the receiving device 106 in method 1400 of FIG. 14.

Figure 15:
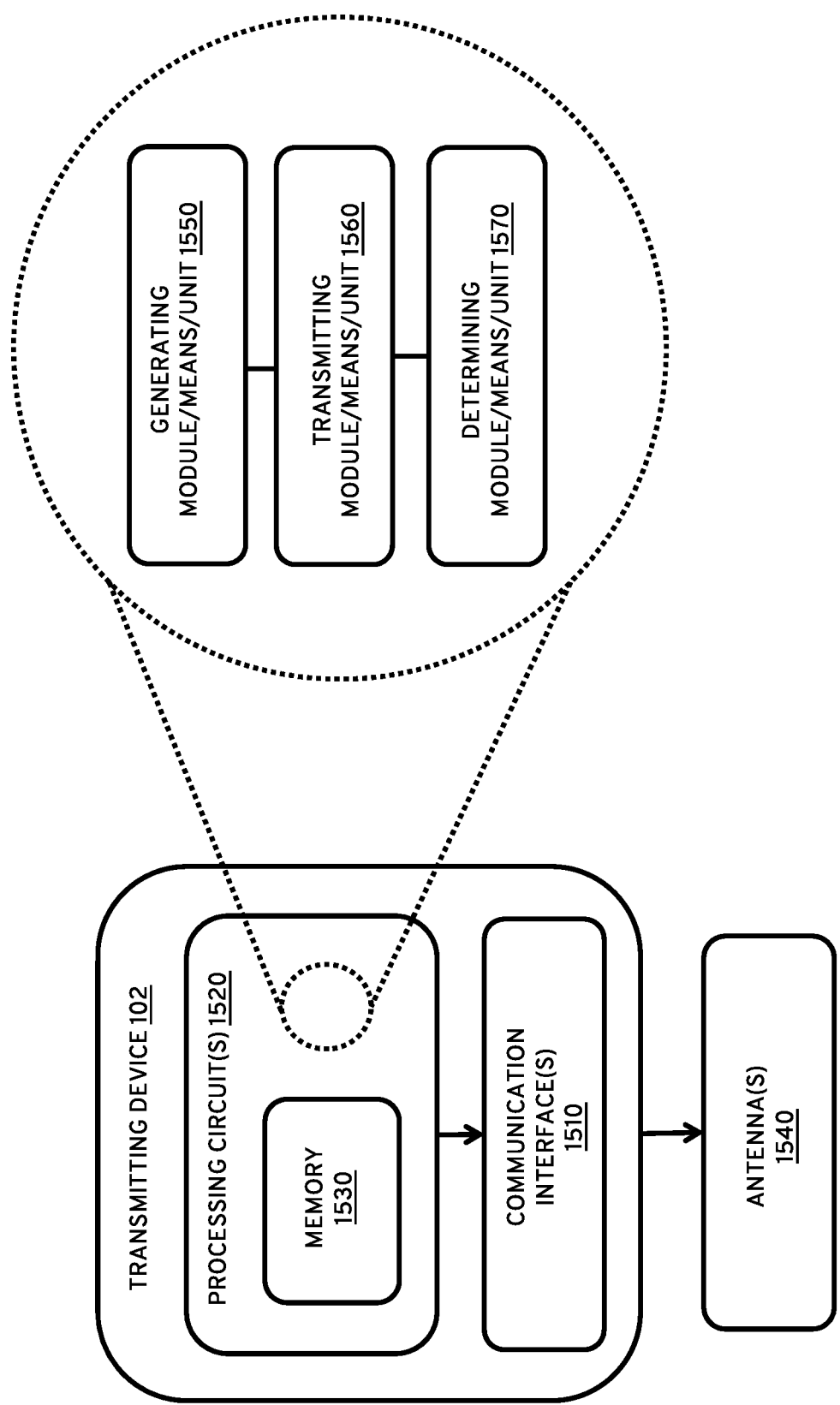
FIG. 15 illustrates details of an example transmitting device according to one or more embodiments.

FIG. 15 illustrates additional details of an example transmitting device 102 according to one or more embodiments. The transmitting device 102 is configured, e.g., via functional means or units 1550 and 1560, to implement processing to perform the aspects described above in reference to FIG. 12 and method 1200.

In at least some embodiments, the transmitting device 102 comprises one or more processing circuits 1520 configured to implement processing of the methods 1200 and 1400 of FIGS. 11 and 13, such as by implementing functional means or units above. In one embodiment, for example, the processing circuit(s) 1520 implements functional means or units as respective circuits. The circuits in this regard may comprise circuits dedicated to performing certain functional processing and/or one or more microprocessors in conjunction with memory 1530. In embodiments that employ memory 1530, which may comprise one or several types of memory such as read-only memory (ROM), random-access memory, cache memory, flash memory devices, optical storage devices, etc., the memory 1530 stores program code that, when executed by the one or more for carrying out one or more microprocessors, carries out the techniques described herein.

In one or more embodiments, the transmitting device 102 also comprises one or more communication interfaces 1510. The one or more communication interfaces 1510 include various components (e.g., antennas 1540) for sending and receiving data and control signals. More particularly, the interface(s) 1510 include a transmitter that is configured to use known signal processing techniques, typically according to one or more standards, and is configured to condition a signal for transmission (e.g., over the air via one or more antennas 1540). Similarly, the interface(s) include a receiver that is configured to convert signals received (e.g., via the antenna(s) 1540) into digital samples for processing by the one or more processing circuits. The transmitter and/or receiver may also include one or more antennas 1540. By utilizing the communication interface(s) 1510 and/or antenna(s) 1540, the transmitting device 102 is able to communicate with other devices to transmit QoS data flows as well as manage the mapping of these flows to radio bearers, remap the flows to different bearers, and/or remove the flows entirely. Furthermore, as shown in FIG. 15, transmitting device 102 may include a generating module/means/unit 1550, a transmitting module/means/unit 1560, and/or a determining module/means/unit 1570 (and/or one or more further modules/means/units not explicitly shown) that are configured, individually or collectively, to perform aspects of methods 1200 and/or 1400, or techniques described anywhere in the present disclosure, to carry out such techniques in transmitting device 102.

FIG. 16 illustrates additional details of an example receiving device 106 according to one or more embodiments. The receiving device 106 is configured, e.g., via functional means or units 1650, 1660, 1670, and/or 1680, to implement processing to perform the aspects described above in reference to FIG. 12 and method 1200, and FIG. 14 and method 1400.

In at least some embodiments, the receiving device 106 comprises one or more processing circuits 1620 configured to implement processing of the methods 1300 and 1500 of FIGS. 12 and 14, such as by implementing functional means or units above. In one embodiment, for example, the processing circuit(s) 1620 implements functional means or units as respective circuits. The circuits in this regard may comprise circuits dedicated to performing certain functional processing and/or one or more microprocessors in conjunction with memory 1630. In embodiments that employ memory 1630, which may comprise one or several types of memory such as read-only memory (ROM), random-access memory, cache memory, flash memory devices, optical storage devices, etc., the memory 1630 stores program code that, when executed by the one or more for carrying out one or more microprocessors, carries out the techniques described herein.

In one or more embodiments, the receiving device 106 also comprises one or more communication interfaces 1610. The one or more communication interfaces 1610 include various components (e.g., antennas 1640) for sending and receiving data and control signals. More particularly, the interface(s) 1610 include a transmitter that is configured to use known signal processing techniques, typically according to one or more standards, and is configured to condition a signal for transmission (e.g., over the air via one or more antennas 1640). Similarly, the interface(s) include a receiver that is configured to convert signals received (e.g., via the antenna(s) 1640) into digital samples for processing by the one or more processing circuits. The transmitter and/or receiver may also include one or more antennas 1640. By utilizing the communication interface(s) 1610 and/or antenna(s) 1640, the receiving device 106 is able to communicate with other devices to transmit QoS data flows as well as manage the mapping of these flows to radio bearers, remap the flows to different bearers, and/or remove the flows entirely. Furthermore, as shown in FIG. 17, receiving device 106 may include a receiving module/means/unit 1650, a demodulating module/means/unit 1660, a determining module/means/unit 1670, and/or a processing module/means/unit 1680 (and/or one or more further modules/means/units not explicitly shown) that are configured, individually or collectively, to perform aspects of methods 1300 and/or 1500, or techniques described anywhere in the present disclosure, to carry out such techniques in receiving device 106.

Those skilled in the art will also appreciate that embodiments herein further include corresponding computer programs. A computer program comprises instructions which, when executed on at least one processor of the receiving device 106 or transmitting device 102 (or UE or network node) cause these devices to carry out any of the respective processing described above. Furthermore, the processing or functionality may be considered as being performed by a single instance or device or may be divided across a plurality of instances devices 102/106 that may be present in a given wireless system such that together the device instances perform all disclosed functionality.

Embodiments further include a carrier containing such a computer program. This carrier may comprise one of an electronic signal, optical signal, radio signal, or computer readable storage medium. A computer program in this regard may comprise one or more code modules corresponding to the means or units described above.

A network node herein is any type of network node (e.g., a base station) capable of communicating with another node over radio signals. A UE is any type device capable of communicating with a network node 106 over radio signals, such as, but not limited to, a device capable of performing autonomous wireless communication with one or more other devices, including a machine-to-machine (M2M) device, a machine-type communications (MTC) device, a user equipment (UE) (however it should be noted that the UE does not necessarily have a "user" in the sense of an individual person owning and/or operating the device). An UE may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

ABBREVIATIONS

| Abbreviation | Explanation |
| --- | --- |
| CBG | Code Block Group |
| CP | Cyclic Prefix |
| DFT | Discrete Fourier Transform |
| FFT | Fast Fourier Transform |
| HARQ | Hybrid Automatic Repeat Request |
| IDFT | Inverse Discrete Fourier Transform |
| IFFT | Inverse Fast Fourier Transform |
| OFDM | Orthogonal Frequency Division Multiplex |
| PA | Power Amplifier |
| PUSCH | Physical Uplink Shared Channel |
| SRS | Sounding Reference Signal |
| TDD | Time Division Duplex |

The invention claimed is:

1. A method performed by a transmitting device in a wireless communication system, comprising:
generating a signal comprising data to be transmitted to a receiving device during a symbol by modulating the data on L-K L-combs, wherein each L-comb has an associated group of subcarriers that are separated from one another by L−1 subcarriers; and
transmitting the generated signal to the receiving device during at least a portion of the symbol.

2. The method of claim 1, further comprising determining a need to modulate the data on the L-K L-combs based on a disturbance in one or more parameters affecting the transmission of the signal.

3. The method of claim 2, further comprising:
determining that the disturbance is contemporaneous with the transmission of the generated signal for less than half of the transmission of the signal; and
performing the generating and the transmitting using one 2-comb based on determining that the disturbance is contemporaneous for less than half of the transmission.

4. The method of claim 2, further comprising:
determining that the disturbance is contemporaneous with the transmission of the generated signal for less than one-fourth of the transmission of the signal; and
performing the generating and the transmitting three 4-combs based on determining that the disturbance is contemporaneous for less than one-fourth of the transmission.

5. The method of claim 1:
wherein the generating the signal comprises zeroing modulation of the data on one or more subcarriers that are not on the L-K L-combs; and
wherein the zeroing the modulation of the data comprises zeroing modulation of the data on subcarriers associated with the K L-combs.

6. The method of claim 1, wherein the modulating the data on the L-K L-combs and the transmitting the signal is associated with a special transmission mode different from a full subcarrier transmission mode, the full subcarrier transmission mode comprising modulating and transmitting the data on each available subcarrier for the symbol.

7. A method performed by a receiving device in a wireless communication system, comprising:
receiving a signal comprising data transmitted by a transmitting device, the transmitting device modulating, during a symbol, the data on L-K L-combs, wherein each L-comb has an associated group of subcarriers that are separated from one another by L−1 subcarriers; and
demodulating the data on the L-K L-combs.

8. The method of claim 7, wherein a portion of the symbol overlaps a disturbance in one or more parameters affecting the transmission and/or reception of the signal.

9. The method of claim 7, wherein the demodulating the data on the L-K L-combs comprises dividing received signal into sub-blocks.

10. The method of claim 9, wherein the demodulating the data on the L-K L-combs comprises processing a subset of the sub-blocks.

11. The method of claim 10, wherein demodulating the data on the L-K L-combs comprises linearly combining the subset of the sub-blocks.

12. A transmitting device, comprising:
processing circuitry;
memory containing instructions executable by the processing circuitry whereby the transmitting device is operative to:
generate a signal comprising data to be transmitted to a receiving device during a symbol by modulating the data on L-K L-combs, wherein each L-comb has an associated group of subcarriers that are separated from one another by L−1 subcarriers; and
transmit the generated signal to the receiving device during at least a portion of the symbol.

13. A receiving device, comprising:
processing circuitry;
memory containing instructions executable by the processing circuitry whereby the device is operative to:
receive a signal comprising data transmitted by a transmitting device, the transmitting device modulating, during a symbol, the data on L-K L-combs, wherein each L-comb has an associated group of subcarriers that are separated from one another by L−1 subcarriers; and
demodulate the data on the L-K L-combs.

14. A method performed by a transmitting device in a wireless communication system, the method comprising:
determining that a transient period, during which a transmission gain, phase, and/or frequency is unstable, at least partially overlaps a transmission period of a symbol, during which symbol contents is to be transmitted, the symbol having a symbol duration;
generating one or more copies of the symbol contents based on the determining; and
transmitting the one or more copies of the symbol to a receiving device during the symbol duration.

15. The method of claim 14, wherein the generating the one or more copies of the symbol contents comprises generating the one or more copies such that at least one of the copies does not overlap the transient period.

16. The method of claim 14, wherein the generating the one or more copies of the symbol contents comprises generating the one or more copies by an OFDM modulator using an Inverse Fast Fourier Transform (IFFT) having a size of half that of a nominal OFDM symbol.

17. The method of claim 14, wherein the generating the one or more copies of the symbol contents comprises generating n copies by an OFDM modulator using an Inverse Fast Fourier Transform (IFFT) having a size of 1/n that of a nominal OFDM symbol.

18. A method performed by a receiving device in a wireless communication system, the method comprising:
determining that a transient period, during which a transmission gain, phase, and/or frequency is unstable, at least partially overlaps a transmission period of a symbol, during which symbol contents is to be transmitted, the symbol having a symbol duration;
receiving one or more copies of the symbol contents based on the determining; and
processing the one or more copies of the symbol contents.

19. The method of claim 18, wherein the processing the one or more copies of the symbol contents comprises using a Fourier Fast Transform (FFT) of a size of half that of a nominal OFDM symbol and processing up to half of the received symbol.

20. The method of claim 18, wherein the processing the one or more copies of the symbol contents comprises:
replicating one of the received one or more copies of the symbol contents to obtain a symbol having a nominal OFDM symbol time duration, wherein the one or more copies comprise n copies; and
utilizing an Fourier Fast Transform (FFT) of a nominal OFDM symbol to process the replicated copies having the nominal OFDM symbol time duration by discarding every nth subcarrier.

* * * * *